United States Patent
Baldi

(10) Patent No.: US 6,379,106 B1
(45) Date of Patent: Apr. 30, 2002

(54) DEPALLETIZING MACHINE

(75) Inventor: Giampietro Baldi, Villafranca di Verona (IT)

(73) Assignee: OMA S.r.l., Viale del Lavora (IT)

( * ) Notice: Subject to any disclaimer, the term of this patent is extended or adjusted under 35 U.S.C. 154(b) by 0 days.

(21) Appl. No.: 09/549,249

(22) Filed: Apr. 14, 2000

(30) Foreign Application Priority Data

Apr. 15, 1999 (IT) ........................................ BA99A0171

(51) Int. Cl.$^7$ .............................................. B65G 59/02
(52) U.S. Cl. .................................... 414/796.9; 414/907
(58) Field of Search ........................... 414/792.6, 796.9, 414/797, 907

(56) References Cited

U.S. PATENT DOCUMENTS

| | | | |
|---|---|---|---|
| 3,697,112 A | | 10/1972 | Nielson et al. ................ 294/65 |
| 4,032,022 A | * | 6/1977 | Smith ................... 414/796.9 X |
| 4,060,955 A | * | 12/1977 | Lachnit ............... 414/796.9 X |
| 4,911,608 A | * | 3/1990 | Krappitz et al. ..... 414/796.9 X |
| 4,993,915 A | * | 2/1991 | Berger et al. ........ 414/792.6 X |
| 5,417,543 A | * | 5/1995 | Focke et al. .............. 414/796.9 |
| 5,582,504 A | * | 12/1996 | Cestonaro ................ 414/796.9 |

FOREIGN PATENT DOCUMENTS

| | | | | |
|---|---|---|---|---|
| DE | 3515115 | | 10/1986 | |
| EP | 0327858 | | 8/1989 | |
| GB | 2072635 | | 10/1981 | |
| JP | 55-161729 | * | 12/1980 | ............... 414/792.6 |
| JP | 56-7833 | * | 1/1981 | ............... 414/792.6 |
| JP | 63-17732 | * | 1/1988 | ............... 414/792.6 |

OTHER PUBLICATIONS

Derwent English Abstract of DE 3515115 Dated Oct. 30, 1986.

Derwent English Abstract of EP 0327858 Dated Aug. 16, 1989.

* cited by examiner

*Primary Examiner*—Janice L. Krizek
(74) *Attorney, Agent, or Firm*—Ladas & Parry

(57) ABSTRACT

A depalletizing machine for unpacking pallets, each defined by a number of stacked layers of products; each layer having a number of parallel, side by side rows of products; the machine having a work platform on which the packed pallets are positioned; a linear input conveyor for successively feeding the packed pallets onto the work platform; a linear output conveyor for conveying off the machine a succession of single products ready for use by other machines; and a separating head for successively transferring a given number of rows of products from the top of the stationary pallet on the work platform to the linear output conveyor; the given number of rows of products being less than the number of rows of products defining each layer in the pallet.

15 Claims, 3 Drawing Sheets

_US 6,379,106 B1_

DEPALLETIZING MACHINE

The present invention relates to a depalletizing machine.

BACKGROUND OF THE INVENTION

As is known, the problem exists of automatically unpacking pallets defined by a number of layers of products, such as bottles, jars, tins and similar, stacked into a block for easy transport. Each layer in the pallet normally comprises a given number of parallel, side by side rows of products arranged on a tray or supporting panel resting on the layer underneath.

With reference to FIG. 1, currently marketed depalletizing machines comprise: a work platform I on which the packed pallet is placed; a linear roller conveyor II for successively feeding the packed pallets onto platform I; and a storage bed III on which the individual layers in the pallet are stored temporarily as the pallet is unpacked.

The storage bed III is located to the side of work platform I, and normally comprises a flat conveyor belt sized to accommodate one or more complete layers of products. The conveyor belt is normally fitted with a deflecting wall slanting with respect to the traveling direction of the belt, and which, as the conveyor belt feeds the individual layers forward, forms a succession of individual products ready for use by other machines.

Currently marketed depalletizing machines also comprise: a separating head IV movable horizontally and vertically over work platform I and storage bed III to successively transfer the whole layers in the pallet from work platform I to storage bed III; a centering device V for compacting and centering each layer in the pallet in the center of work platform I, to facilitate pickup of the whole layer of products by separating head IV; and a tray or supporting panel pickup device VI, which moves over the work platform to remove each tray or supporting panel off the top of the pallet as soon as the corresponding layer in the pallet has been transferred onto storage bed III.

Depalletizing machines of the above type have the drawback of being extremely expensive and bulky, thus preventing wide-scale use in small bottling or canning plants. Moreover, such machines have a poor degree of flexibility, being designed to maintain a high output rate, which is often considerably in excess of small bottling or canning plant requirements.

SUMMARY OF THE INVENTION

It is an object of the present invention to provide a compact depalletizing machine, which also provides for a greater degree of flexibility as compared with currently marketed types.

According to the present invention, there is provided a depalletizing machine for receiving at the input a succession of pallets of products, and supplying at the output a succession of single products; each packed pallet being defined by a number of stacked layers of products, and each said layer of products comprising a given number of parallel, side by side rows of products; the depalletizing machine comprising a work platform on which the packed pallet is positioned, and a linear, output conveyor for conveying said succession of single products off the depalletizing machine; said depalletizing machine being characterized by comprising a separating head for successively transferring a given number of rows of products from the top of the stationary pallet on the work platform to the linear output conveyor; said given number of tows of products being less than the number of rows of products defining each layer in said pallet.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
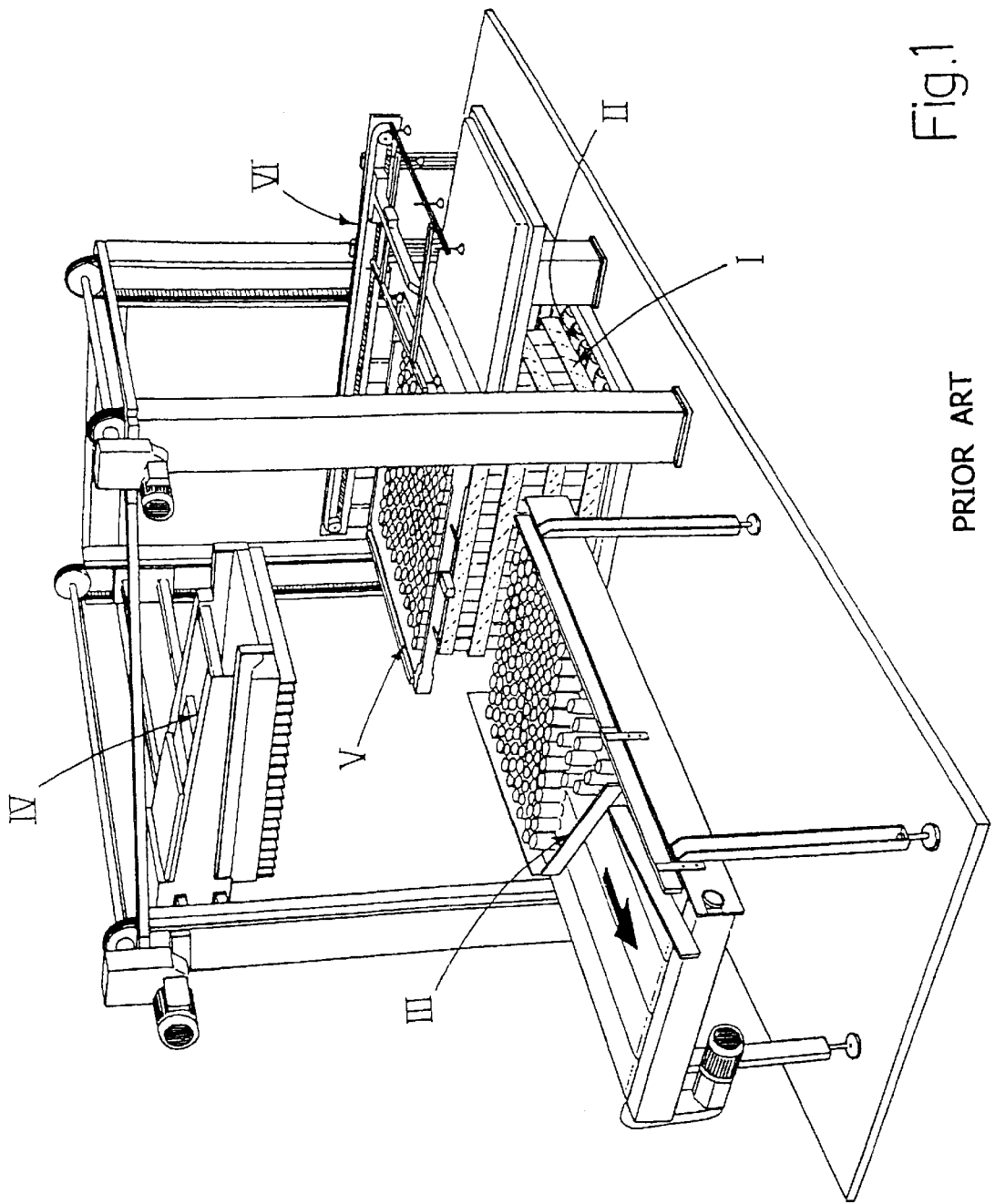
FIG. 1 shows a front view of a depalletizing machine of the prior art.
Figure 2:
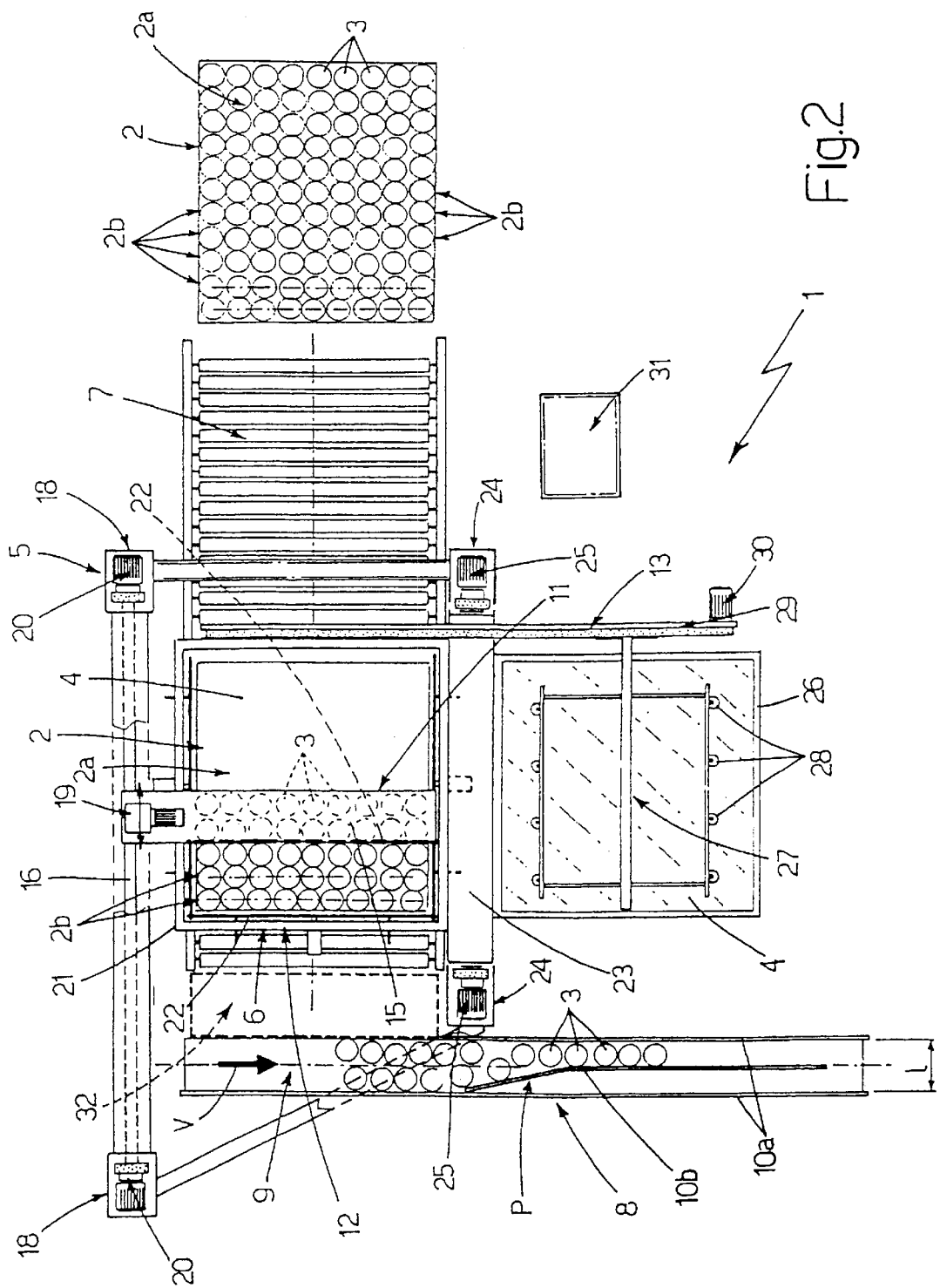
FIG. 2 shows a plan view of a depalletizing machine in accordance with the teachings of the present invention.
Figure 3:
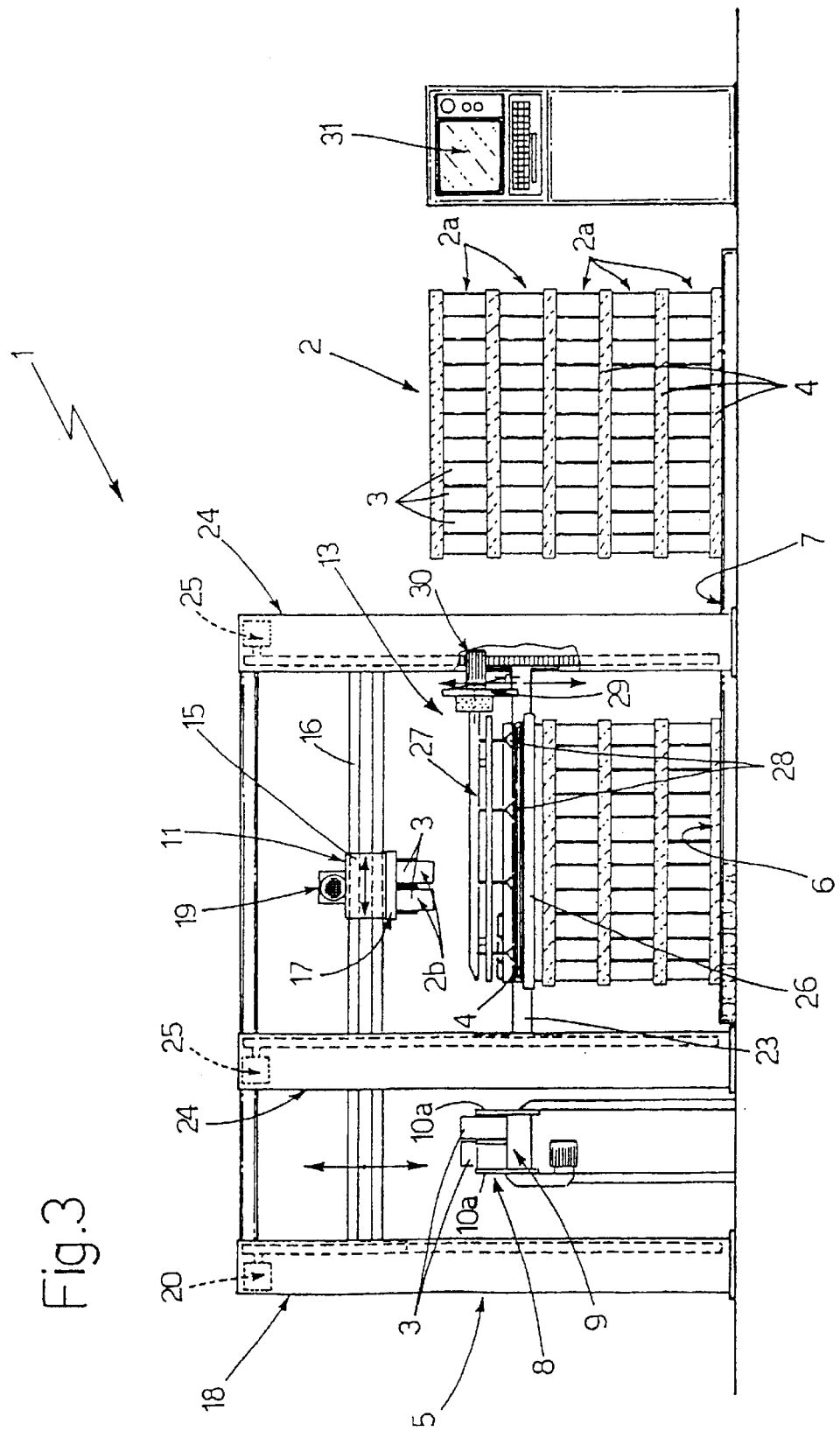
FIG. 3 shows a front view of the FIG. 2 depalletizing machine.

Number 1 in FIGS. 2 and 3 indicates as a whole a depalletizing machine for automatically unpacking pallets 2 of products 3 fed successively to the machine, and for supplying at the output a succession of single products 3 ready for use by other machines.

Pallets 2 are each normally defined by a number of layers 2a of products 3, such as bottles, jars, tins and similar, stacked into a block for easy transport (in the example shown, pallet 2 comprises five layers 2a). Each layer 2a in pallet 2 is normally defined by a given number of parallel, side by side rows 2b of products 3 on a tray or supporting panels 4 resting on the layer 2a underneath (in the example shown, each layer 2a comprises eleven rows 2b of products 3).

Machine 1 comprises a supporting frame 5; a work platform 6 on the bed of frame 5; a first linear conveyor 7, preferably but not necessarily a roller conveyor, for feeding the packed pallets 2 successively onto work platform 6; and a second linear conveyor 8 for conveying off machine 1 a succession of single products 3 ready for use by other machines.

Linear conveyor 8 is located adjacent to work platform 6, and comprises a belt conveyor 9 of such a width l as to simultaneously receive a number of rows 2b of products 3 smaller than the number of rows 2b defining each layer 2a in pallet 2.

More specifically, in the example shown linear conveyor 8 comprises a belt conveyor 9 of such a width l as to simultaneously receive only two parallel, side by side rows 2b of products 3. In the example shown, belt conveyor 9 comprises two longitudinal sides 10a extending along the lateral edges of the belt and along the whole length of belt conveyor 9; and a deflecting wall lob located on the traveling surface P of products and crosswise to the traveling direction V of products 3, so as to deflect the two rows 2b of products 3 onto one of the two longitudinal sides 10a and so form a succession of single products 3 as rows 2b of products 3 are fed forward by belt conveyor 9.

It should be pointed out that, in the example shown, linear conveyor 8, i.e. belt conveyor 9, is so oriented that the traveling direction V of products 3 is parallel to the rows 2b of products 3 defining the various layers 2a in pallet 2.

With reference to FIGS. 2 and 3, machine. 1 also comprises a separating head 11 for successively transferring a given number of rows 2b of products 3 from the top of the stationary pallet 2 on work platform 6 to linear conveyor 8; a centering device 12 for successively compacting and centering, in the center of work platform 6, each layer 2a in the stationary pallet 2 on work platform 6 to facilitate pickup of rows 2b of products 3 by separating head 11; and a pickup device 13 for picking up each tray or supporting panel 4 off the top of pallet 2 once the corresponding layer 2a in pallet 2 has been transferred completely to linear conveyor 8.

Separating head 11 is movable, on frame 5, horizontally and vertically over work platform 6 and linear conveyor 8, and provides for successively removing, off the top of the stationary pallet 2 on work platform 6, a number of rows 2b of products 3 smaller than the number of rows 2b of products 3 defining each layer 2a in pallet 2 (even only one row of products 3 at a time), and for depositing the rows 2b of products 3 onto belt conveyor 9.

Obviously, the number of rows 2b of products 3 removed is also less than or equal to the number of rows 2b of products 3 which may be deposited simultaneously onto linear conveyor 8.

Besides successively compacting and centering each layer 2a pallet 2 in the center of work platform 6, centering device 12 also provides for compacting and maintaining side by side the rows 2b of products 3 left on the top of pallet 2 as rows 2b of products 3 are removed off the top of pallet 2 and deposited onto linear conveyor 8 by separating head 11.

In the particular example shown, separating head 11 transfers two rows 2b of products 3 at a time off the top of the stationary pallet 2 on work platform 6 to linear conveyor 8.

With reference to FIGS. 2 and 3 in the example shown, separating head 11 comprises a slide 15 mounted to slide along a horizontal cross member 16 extending alongside and above work platform 6 and linear conveyor 8; and a product pickup device 17 which, on command, makes rows 2b of products 3 integral with slide 15. In the particular example shown, product pickup device 17 provides, on command, for making two adjacent rows 2b of layer 2a integral with slide 15.

It should be pointed out that, except in size, product pickup device 17 is identical to those currently used, and therefore requires no further explanation.

Horizontal cross member 16 of frame 5 is in turn mounted to slide on two vertical, parallel, facing up rights 18 extending from the bed of frame 5.

Machine 1 also comprises actuating means 19 for activating separating head 11 and, on command, moving slide 15 along horizontal cross member 16; and actuating means 20 for activating horizontal cross member 16 and, on command, moving horizontal cross member 16 along the two vertical uprights 18 of frame 5. Both actuating means 19 and 20 are already used widely by the Applicant and therefore require no further description With referent to FIG. 2, centering device 12 comprises a rectangular supporting frame 21 fitted to move vertically on frame 5 over work platform 6, and a number of centering surfaces 22 arranged along the inner peripheral edge of rectangular frame 21.

More specifically, rectangular frame 21 lies in a horizontal plane, and is coaxial with the vertical axis of work platform 6, so that the packed pallet 2, once positioned on work platform 6, is located inside rectangular frame 21. Centering surfaces 22, on the other hand, are movable, on command, towards each other in a horizontal direction to successively compact each layer 2a in pallet 2 in the center of work platform 6, and to compact rows 2b of products 3 during separation of layer 2a.

Rectangular frame 21 is fixed to a horizontal supporting cross member 23 forming part of frame 5 and which in turn is mounted to slide vertically along two vertical uprights 24 extending from the base of frame 5, on the opposite side of work platform 6 with respect to vertical uprights 18.

In this case, too, machine 1 comprises actuating means 25 for activating horizontal cross member 23 and, on command, moving horizontal cross member 23 along the two vertical uprights 24, so as to position rectangular frame 21 at any layer 2a in pallet 2. Like actuating means 19 and 20, actuating means 25 are already used widely by the Applicant and therefore require no further description.

With reference to FIG. 2, it should be pointed out that, in the example shown, horizontal cross members 16 and 23 extend on opposite sides of work platform 6 and parallel to the longitudinal axis of linear conveyor 7; that separating head 11 projects from horizontal cross member 16, perpendicularly to horizontal cross members 16 and 23, so as to be parallel to the rows 2b of products 3 defining the various layers 2a in the stationary pallet 2 on work platform 6; and that the longitudinal axis of linear conveyor 8 is perpendicular to the longitudinal axis of linear conveyor 7.

With reference to FIGS. 2 and 3, pickup device 13 also of known type—for picking up trays or supporting panels 4 comprises a storage platform 26 for storing trays or supporting panels 4, and which is fixed to horizontal cross member 23, on the opposite side to rectangular frame 21; and a carriage 27, which, on command, removes the tray or supporting panel 4 off the top of pallet 2, and deposits the tray or panel onto platform 26.

More specifically, carriage 27 is movable over work platform 6 and platform 26, and comprises a number of pneumatic suction cups 28 which, on command, grip the tray or supporting panel 4 located beneath carriage 27. In the example shown, carriage 27 is mounted to slide along a horizontal rail 29 extending perpendicular to horizontal cross member 23 and over one side of rectangular frame 21; and suction cups 28 are movable vertically on carriage 27 so as to contact and grip, on command, the tray or supporting panel 4 beneath carriage. 27.

Machine 1 obviously comprises actuating means 30 for activating carriage 27, and which, on command, move carriage 27 along horizontal rail 29 to position carriage 27 selectively over work platform 6 of platform 26. Actuating means 30 are already used widely by the Applicant and therefore require no further description.

Finally, machine 1 comprises a control unit 31 for controlling linear conveyors 7, 8, actuating means 19, 20, 25, 30, and suction cups 28, so as to automatically unpack pallets 2.

Operation of depalletizing machine 1 as described above is easily deducible from the foregoing description with no further explanation required.

In the variation shown by the dash line in FIG. 2, in addition to belt conveyor 9, linear conveyor 8 also comprises an intermediate storage bed 32 located between work platform 6 and belt conveyor 9. In this variation, separating head 11 deposits the rows 2b of products 3 removed off the top of pallet 2 directly onto intermediate storage bed 32 as opposed to belt conveyor 9. Intermediate storage bed 32 then provides for successively transferring rows 2b of products 3 to belt conveyor 9, which, in this case, may be oriented anyhow, i.e. not necessarily so that the traveling direction V of products 3 is parallel to rows 2b of products 3 defining the various layers 2a in pallet 2. Obviously, intermediate storage bed 32 is also sized to simultaneously receive a number of rows 2b of products 3 smaller number of rows 2b defining each layer 2a in pallet 2.

The advantages of depalletizing machine 1 will be obvious from the foregoing description: being designed to successively remove a number of rows 2b of products 3 smaller than the number of rows 2b of products defining each layer 2a in pallet 2, machine 1 comprises a linear output conveyor 8 considerably narrower than those currently used, thus enabling a drastic reduction in size.

Reducing the number of rows 2b of products transferred at each pass of separating head 11 also provides for reducing the weight of separating head 11 and frame 5, so that lower-power electric motors may be used for actuating means 19 and 20, thus enabling a drastic reduction in electricity consumption.

Clearly, changes may be made to depalletizing machine 1 as described and illustrated herein without, however, departing from the scope of the present invention.

What is claimed is:

1. A depalletizing machine (1) for receiving at an input a succession of packed pallets (2) of products (3), and supplying at an output a succession of single products (3); each packed pallet (2) being defined by a number of stacked layers (2a) of products (3), and each said layer (2a) of products (3) comprising a given number of parallel, side by side rows (2b) of products (3); the depalletizing machine (1) comprising a work platform (6) on which the packed pallet (2) is positioned, a linear output conveyor (8) for conveying said succession of single products (3) off the depalletizing machine (1), and a separating head (11) for successively transferring a given number of rows (2b) of products (3) from the top of a pallet (2) on the work platform (6) to the linear output conveyor (8); said given number of rows (2b) of products (3) being fewer than the number of rows (2b) of products (3) defining each layer (2a) on said pallet (2); said depalletizing machine (1) comprising a centering means (12) for compacting and maintaining side by side on the pallet a number of rows that is less than a total number of rows that is packable on the pallet.

2. A depalletizing machine as claimed in claim 1, characterized in that said linear output conveyor (8) is sized to simultaneously receive a number of rows (2b) of products (3) smaller than the number of rows (2b) defining each layer (2a) in said pallet (2).

3. A depalletizing machine as claimed in claim 2, characterized in that said linear output conveyor (8) is so oriented that the traveling direction (V) of the products (3) is parallel to the rows (2b) of products (3) defining the various layers (2a) on the pallet (2).

4. A depalletizing machine as claimed in claim 2, characterized in that said linear output conveyor (8) comprises a belt conveyor (9) of such a width (l) as to simultaneously receive a number of rows (2b) of products (3) smaller than the number of rows (2b) defining each layer (2a) in said pallet (2).

5. A depalletizing machine as claimed in claim 4, characterized in that said separating head (11) deposits the rows (2b) of products (3) removed off the top of the pallet (2) directly onto said belt conveyor (9).

6. A depalletizing machine as claimed in claim 4, characterized in that said linear output conveyor (8) comprises an intermediate storage bed (32) located between said work platform (6) and said belt conveyor (9); the separating head (11) depositing the rows (2b) of products (3) removed off the top of the pallet (2) director onto said intermediate storage bed (32), which in turn successively transfers the rows (2b) of products (3) to said belt conveyor (9).

7. A depalletizing machine as claimed in claim 1, characterized in that said linear output conveyor (8) is located adjacent to said work platform (6).

8. A depalletizing machine as claimed in claim 1, characterized by comprising a linear input conveyor (7) for successively feeding the packed pallets (2) onto said work platform (6).

9. A depalletizing machine as claimed in claim 8, characterized in that said linear input conveyor (7) extends perpendicular to said linear output conveyor (8).

10. A depalletizing machine as claimed in claim 8, characterized in that said linear input conveyor (7) is a roller conveyor.

11. A depalletizing machine as claimed in claim 1, characterized in that said separating head (11) is movable vertically and horizontally over said work platform (6) and said linear output conveyor (8).

12. A depalletizing machine as claimed in claim 1, wherein said centering means (12) includes means for compacting and centering, in the center of said work platform (6), each layer (2a) on the pallet (2) on the work platform (6) to facilitate pickup of rows (2b) of products (3) by said separating head (11).

13. A depalletizing machine as claimed in claim 1, comprising a pickup device (13) for picking up trays or supporting panels (4), and which provides for removing each tray or supporting panel (4) off the top of the pallet (2) once the corresponding layer (2a) on the pallet (2) has been transferred completely to the linear output conveyor (8); the rows (2b) of products (3) on each layer (2a) in the pallet (2) being arranged on a tray or supporting panel (4) resting on the layer (2a) directly underneath.

14. A depalletizing machine as claimed in claim 1, wherein said centering means (12) comprises a rectangular supporting frame (21) fitted to move vertically over said work platform (6), and a plurality of centering surfaces (22) arranged along an inner peripheral edge of said rectangular frame (21).

15. A depalletizing machine as claimed in claim 14, wherein said rectangular supporting frame (21) lies in a horizontal plane, and is coaxial with the vertical axis of said work platform (6), so that said packed pallet (2), once positioned on said work platform (6), is located inside said rectangular frame (21), said centering surfaces (22) being movable, on command, towards each other in a horizontal direction to successively compact each layer (2a) on said pallet (2) towards the center of said work platform (6), and to compact rows (2b) of products (3) during separation of each said layer (2a).

\* \* \* \* \*

UNITED STATES PATENT AND TRADEMARK OFFICE
CERTIFICATE OF CORRECTION

PATENT NO.    : 6,379,106 B1                                     Page 1 of 1
DATED         : April 30, 2002
INVENTOR(S)   : Giampietro Baldi It is certified that error appears in the above-identified patent and that said Letters Patent is hereby corrected as shown below:

<u>Title page,</u>
Item [30], "BA99A0171" should read -- BO99A0171 --

Signed and Sealed this

Eleventh Day of March, 2003

JAMES E. ROGAN
*Director of the United States Patent and Trademark Office*